United States Patent
Brumm et al.

(10) Patent No.: US 10,207,867 B2
(45) Date of Patent: Feb. 19, 2019

(54) AUTOMATED PALLET STORAGE AND RETRIEVAL SYSTEM

(71) Applicant: Swisslog Logistics, Inc., Newport News, VA (US)

(72) Inventors: Christopher Brumm, Ripon, CA (US); Mohan Ramankutty, Mountain House, CA (US); Rodney Tipton, Acampo, CA (US); Pat Mitchell, Stockton, CA (US)

(73) Assignee: Swisslog Logistics, Inc., Newport News, VA (US)

( * ) Notice: Subject to any disclaimer, the term of this patent is extended or adjusted under 35 U.S.C. 154(b) by 117 days.

(21) Appl. No.: 15/222,827

(22) Filed: Jul. 28, 2016

(65) Prior Publication Data
US 2017/0101264 A1 Apr. 13, 2017

Related U.S. Application Data

(60) Provisional application No. 62/187,632, filed on Jul. 1, 2015.

(51) Int. Cl.
*B65G 1/04* (2006.01)
*B61D 3/00* (2006.01)
(Continued)

(52) U.S. Cl.
CPC .............. *B65G 1/0492* (2013.01); *B60L 5/40* (2013.01); *B60M 1/34* (2013.01); *B61D 3/00* (2013.01); *B65G 1/02* (2013.01)

(58) Field of Classification Search
CPC .......... B65G 1/0492; B65G 1/02; B60M 1/34; B60L 5/40; B61D 3/00
See application file for complete search history.

(56) References Cited

U.S. PATENT DOCUMENTS

| 1,664,499 A | 4/1928 | Baker |
| 2,734,126 A * | 2/1956 | Sims .................. F21S 8/02 |
| | | 248/343 |

(Continued)

FOREIGN PATENT DOCUMENTS

| JP | 2000341478 A | * | 12/2000 |
| JP | 2004268782 A | * | 9/2004 |

(Continued)

OTHER PUBLICATIONS

International Search Report and Written Opinion for PCT/US2015/12366, dated Apr. 14, 2015.

(Continued)

*Primary Examiner* — Jeanette E Chapman
(74) *Attorney, Agent, or Firm* — Bachman & LaPointe, P.C.

(57) ABSTRACT

A multi-level storage structure includes a plurality of vertical supports, a plurality of row spacing members connecting vertical posts positioned laterally relative to each other, a plurality of row rails connecting vertical posts positioned longitudinally relative to each other and configured to support at least one row cart, a plurality of aisle rails extending perpendicular to the plurality of row rails and configured to support at least one aisle cart, and a plurality of pre-formed holes formed in at least one of the vertical supports, row spacing members, row rails, and aisle rails to mount at least one of a lighting system, a fire suppression system, a mobile safety tie off carriage, and at least one support brace to the storage structure. The plurality of pre-formed holes are formed prior to assembly of the storage structure.

26 Claims, 11 Drawing Sheets

(51) Int. Cl.
  *B60L 5/40*   (2006.01)
  *B60M 1/34*   (2006.01)
  *B65G 1/02*   (2006.01)

(56) References Cited

U.S. PATENT DOCUMENTS

| | | | | |
|---|---|---|---|---|
| 2,808,996 | A | 10/1957 | Delfox | |
| 3,090,228 | A * | 5/1963 | Laager et al. | G01N 3/313 244/122 AC |
| 3,520,424 | A * | 7/1970 | Lemelson | B65G 1/0421 414/273 |
| 3,973,685 | A * | 8/1976 | Loomer | B65G 1/0414 414/273 |
| 4,007,843 | A * | 2/1977 | Lubbers | B65G 1/0414 104/48 |
| 4,328,422 | A * | 5/1982 | Loomer | B65G 1/065 250/202 |
| 4,459,078 | A * | 7/1984 | Chiantella | B65G 1/0414 414/279 |
| 4,470,742 | A * | 9/1984 | Schindler | B65G 1/0478 414/286 |
| 4,936,738 | A * | 6/1990 | Brennan | B65G 1/02 414/267 |
| 5,707,199 | A * | 1/1998 | Faller | B65G 1/0478 414/21 |
| 6,042,321 | A * | 3/2000 | Labell | B65G 1/0414 414/276 |
| 6,269,904 | B1 * | 8/2001 | Morhaus | A62B 35/0087 182/36 |
| 6,280,135 | B1 | 8/2001 | Cunningham | |
| 6,400,452 | B1 | 6/2002 | Maynard | |
| 6,493,614 | B1 | 12/2002 | Jung | |
| 6,550,523 | B1 | 4/2003 | Chen | |
| 6,652,213 | B1 * | 11/2003 | Mitchell | B65G 1/0492 414/279 |
| 7,269,908 | B1 * | 9/2007 | Alvar | G01C 15/105 33/228 |
| 8,425,173 | B2 * | 4/2013 | Lert | B65G 1/045 414/280 |
| 9,020,632 | B2 * | 4/2015 | Naylor | B65G 1/065 414/273 |
| 9,334,114 | B2 * | 5/2016 | Salichs | B65G 1/026 |
| 9,630,774 | B2 * | 4/2017 | Traversa | B65G 1/0492 |
| 9,725,240 | B2 * | 8/2017 | Salichs | B65G 1/1371 |
| 9,796,527 | B1 * | 10/2017 | Kaukl | B65G 1/0492 |
| 2004/0193339 | A1 | 9/2004 | Hulden | |
| 2004/0210343 | A1 | 10/2004 | Kim et al. | |
| 2005/0051505 | A1 * | 3/2005 | Lewis | B65G 1/06 211/151 |
| 2005/0118003 | A1 * | 6/2005 | Mitchell | B65G 1/0414 414/284 |
| 2009/0139940 | A1 * | 6/2009 | Maniscalco | H01M 2/1005 211/1.57 |
| 2010/0316469 | A1 | 12/2010 | Lert et al. | |
| 2011/0175533 | A1 * | 7/2011 | Holman | E04B 9/32 315/130 |
| 2012/0002418 | A1 * | 1/2012 | Wang | G09F 13/22 362/249.02 |
| 2012/0297559 | A1 | 11/2012 | Lee et al. | |
| 2013/0129456 | A1 | 5/2013 | Salichs et al. | |
| 2014/0223661 | A1 * | 8/2014 | Galloway | A61G 7/1042 5/85.1 |
| 2016/0376103 | A1 * | 12/2016 | De Angelis | B65G 1/1371 414/284 |
| 2018/0035625 | A1 * | 2/2018 | Lindbo | B65G 57/03 |
| 2018/0044111 | A1 * | 2/2018 | Clarke | B65G 57/03 |

FOREIGN PATENT DOCUMENTS

| | | |
|---|---|---|
| WO | 2015/058192 A1 | 4/2015 |
| WO | 2015/112665 A1 | 7/2015 |
| WO | 2015/134529 A1 | 9/2015 |

OTHER PUBLICATIONS

International Search Report and Written Opinion for PCT/US2014/061372, dated Feb. 4, 2015.

International Search Report and Written Opinion for PCT/US2015/018530, dated Jul. 2, 2015.

* cited by examiner

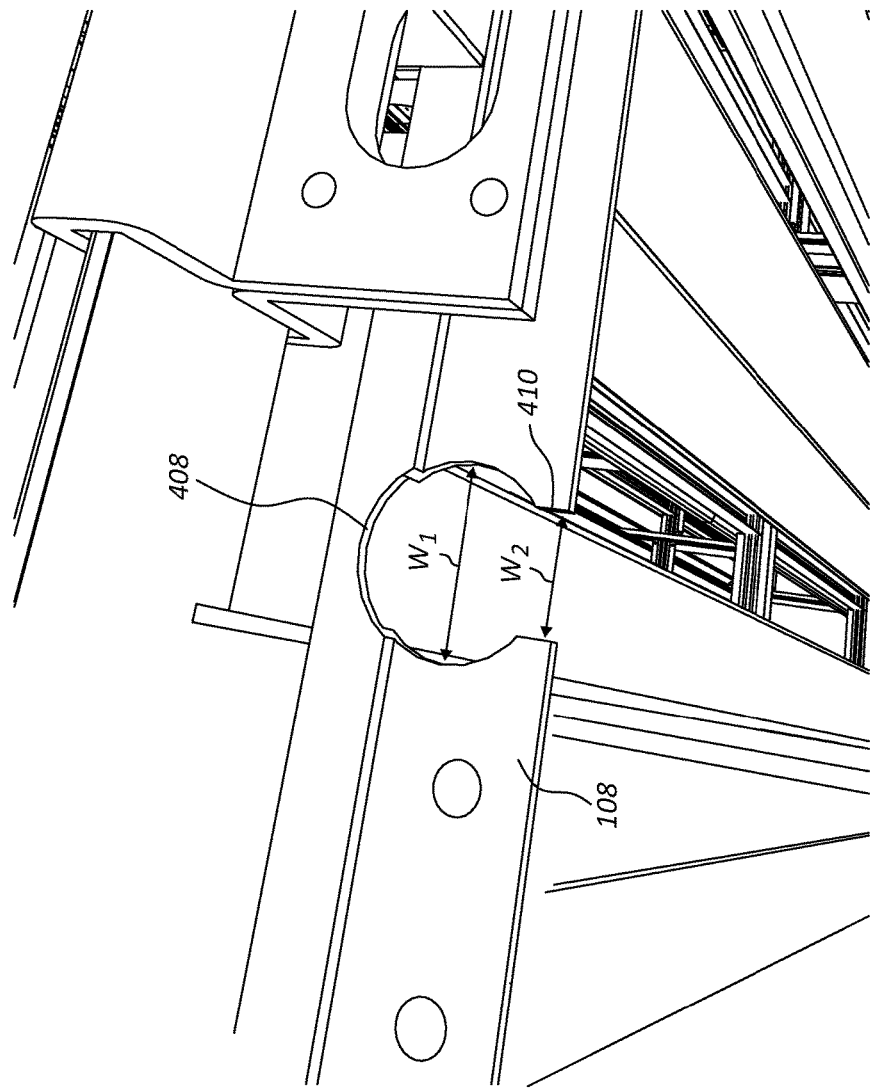

AUTOMATED PALLET STORAGE AND RETRIEVAL SYSTEM

CROSS-REFERENCE TO RELATED APPLICATION

Benefit is claimed of U.S. Patent Application No. 62/187,632, filed Jul. 1, 2015, and entitled "Automated Pallet Storage and Retrieval System", the disclosure of which is incorporated by reference herein in its entirety as if set forth at length.

TECHNICAL FIELD

The present disclosure generally relates to pallet load storage structures having rails for automatic load transporting vehicles and specifically relates to auxiliary features for such storage structures.

BACKGROUND

Storage structures for automated warehouses are used to store palletized loads. The design of these storage structures is usually based on traditional, non-automated warehouse storage structures, but with rails added to enable the use of motorized load vehicles (i.e., carts or robotic vehicles). Thus, horizontal rails are typically added to horizontal beams that are supported by vertical columns. These horizontal rails may form aisles and rows within layered tiers of the structure. Elevators and robotic vehicles may move loads throughout the aisles and rows to various storage positions in the structure. Aisles and rows may each support robotic vehicles having different characteristics, so aisle rails and row rails may each need to be installed in the structure to allow aisle carts and row carts to traverse their intended courses. The addition of robotic vehicle rails on top of the pallet shelving rack members is redundant for structural integrity and increases the labor needed for erection of the structure.

Traditional storage structures are also inherently laterally unstable due to their loose joints that are designed for ease of assembly and disassembly in order to allow for quick changes in structural member locations (i.e., elevations) to accommodate new and/or future pallet sizes. Diagonal struts between the horizontal members and vertical columns often must be added to provide rigidity against side impacts (e.g., from fork trucks), earthquakes, and other incidents. The diagonal supports increase the materials and labor expended to build and maintain the storage structure, thereby reducing the overall efficiency of the structure.

Additionally, simply adding vehicle rails to a traditional storage structure may waste valuable space in the warehouse structure.

Assembly of such storage structures can be labor intensive, particularly related to mounting auxiliary systems such as fire suppression systems and lighting to the storage structure. Typically, individual holes must be formed in the structural components of the storage structure in order to accommodate mounting of such auxiliary systems. Formation of such holes and installation of auxiliary systems after assembly of the storage structure can add significant time and associated costs to construction. There is therefore a need for improvements in at least some aspects of automated storage systems.

SUMMARY

According to one aspect of the present disclosure, a multi-level storage structure includes a plurality of spaced apart vertical supports, a plurality of row spacing members connected to and laterally spacing apart the vertical supports, a plurality of row rails connected to and longitudinally spacing apart the vertical supports, the row rails being configured to support at least one row cart, and a plurality of aisle rails extending perpendicular to the plurality of row rails and configured to support at least one aisle cart. The multi-level storage structure also includes a plurality of pre-formed holes formed in at least one of the vertical supports, row spacing members, row rails, and aisle rails to mount at least one of a lighting system, a fire suppression system, a fall protection system, and at least one support brace to the storage structure, the plurality of pre-formed holes being formed prior to assembly of the storage structure.

In one example, the plurality of row spacing members may include the plurality of pre-formed holes, and the plurality of pre-formed holes may be configured to receive at least one of piping of the fire suppression system and light fixtures of the lighting system. At least one of the plurality of vertical supports and the plurality of row rails may include the plurality of pre-formed holes, and the plurality of pre-formed holes may be configured to receive at least one of electrical conduit and electrical wiring of the lighting system. The aisle rails may include the plurality of pre-formed holes, and the plurality of pre-formed holes may be configured to receive fasteners to connect the at least one support brace to the plurality of aisle rails. The plurality of pre-formed holes may be at least one of stamped holes and punched holes that are formed during manufacture of the in at least one of the vertical supports, row spacing members, row rails, and aisle rails. The multi-level storage structure may further include a plurality of load rails extending parallel to the plurality of row rails and configured to support at least one loaded pallet. The plurality of pre-formed holes being formed in the load rails by stamping or punching during manufacture of the load rails.

Another embodiment is directed to a multi-level storage structure that includes a plurality of vertical supports, a plurality of row rails connecting vertical posts positioned longitudinally relative to each other and configured to support at least one row cart, a plurality of aisle rails extending perpendicular to the plurality of the row rails and configured to support at least one aisle cart, a plurality of load rails extending parallel to the plurality of row rails and configured to support at least one loaded pallet, and a carriage mounted to a flange portion of at least one of the plurality of aisle rails. The carriage is configured to move longitudinally along a length of the at least one of the plurality of aisle rails.

In one example, the at least one of the plurality of aisle rails may include a wheel support surface along a top portion thereof and a flange portion along a bottom portion thereof. The flange may include a T-shape construction for the carriage to be mounted on. The storage structure may include at least one lighting member mounted to the carriage. The storage structure may include at least one rechargeable battery mounted to the carriage. The storage structure may include at least one lighting member pivotally mounted to the carriage. The carriage may further include a safety harness mounting bracket configured to secure a worker's safety harness.

A further embodiment is directed to a multi-level storage structure that includes a plurality of vertical supports, a plurality of row rails connecting vertical posts positioned longitudinally relative to each other and configured to support at least one row cart, a plurality of load rails extending parallel to the plurality of row rails and configured to support at least one loaded pallet, a plurality of aisle rails extending perpendicular to the plurality of row rails and configured to support at least one aisle cart, a plurality of row spacing members connecting vertical posts positioned laterally relative to each other, the plurality of row spacing members comprising pre-formed holes, and a fire suppression system positioned in the pre-formed holes of the plurality of row spacing members. The first suppression system includes a plurality of pipes, a plurality of T-joints extending from at least some of the plurality of pipes, and a plurality of sprinkler heads mounted to at least some of the plurality of T-joints.

The plurality of pipes with T-joints and sprinkler heads may be insertable through the pre-formed holes during assembly of the storage structure. The pre-formed holes may include a joint portion extending to an edge of the plurality of row spacing members and sized to have the T-joint pass therethrough, and a pipe portion formed continuous with the joint portion and sized to have the pipe pass therethrough. The pipe portion may have a greater maximum width dimension than a maximum width dimension of the joint portion.

The plurality of aisle rails may be mounted directly to the plurality of row rails, and the plurality of row rails may be connected directly to the plurality of row spacing members.

Another embodiment is directed to an automated aisle rail cart that includes a base structure, a left set of wheels configured to contact a first rail of storage structure, and a right set of wheels configured to contact a second rail of a storage structure. The left set of wheels include inner and outer flanges that extend along inner and outer surface of the first rail, and the right set of wheels is free of flanges. In another embodiment, the right set of wheels includes inner and outer flanges that extend along inner and outer surface of the first rail, while the left set of wheels is free of flanges. The right set of wheels and the left set of wheels may be exchangeable with each other on the automated rail cart.

The aisle rail cart may include a power collector extending laterally from the base structure and arranged to engage a power track mounted to one of the first and second rails. The aisle rail cart may include at least one position sensor mounted to the base structure and arranged to detect at least one position feature mounted to one of the first and second rails. The at least one position feature may include a bar code. The base structure may include a recessed portion sized to carry an automated row lift cart.

Another aspect of the present disclosure relates to a multi-level storage structure that includes a plurality of vertical supports, a plurality of row rails connecting vertical posts positioned longitudinally relative to each other and configured to support at least one row cart, a plurality of load rails extending parallel to the plurality of row rails and configured to support at least one loaded pallet, a plurality of aisle rails extending perpendicular to the plurality of the row rails and configured to support at least one aisle cart, and at least one aisle cart stop assembly. The at least one aisle cart stop assembly is mounted to one or more of the plurality of aisle rails and is configured to provide a longitudinal position stop for the at least one aisle cart in at least one direction of movement along the one or more of the plurality of aisle rails.

The at least one aisle cart stop assembly may include a mounting bracket configured to connect the aisle cart stop assembly to the one or more of the plurality of aisle rails, and a stop member slidingly coupled to the mounting bracket and positioned to contact the at least one aisle cart. The stop member may be adjustable relative to the mounting bracket to adjust a location of the longitudinal position stop. The at least one cart stop assembly may further include a shock absorber interposed between the mounting bracket and the stop member and operable to decelerate the aisle cart upon contact with the stop member.

The above summary is not intended to describe each embodiment or every implementation of embodiments of the present disclosure. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 4A is a perspective view of a row spacing member of the storage structure shown in FIG. 1.

Figure 1:
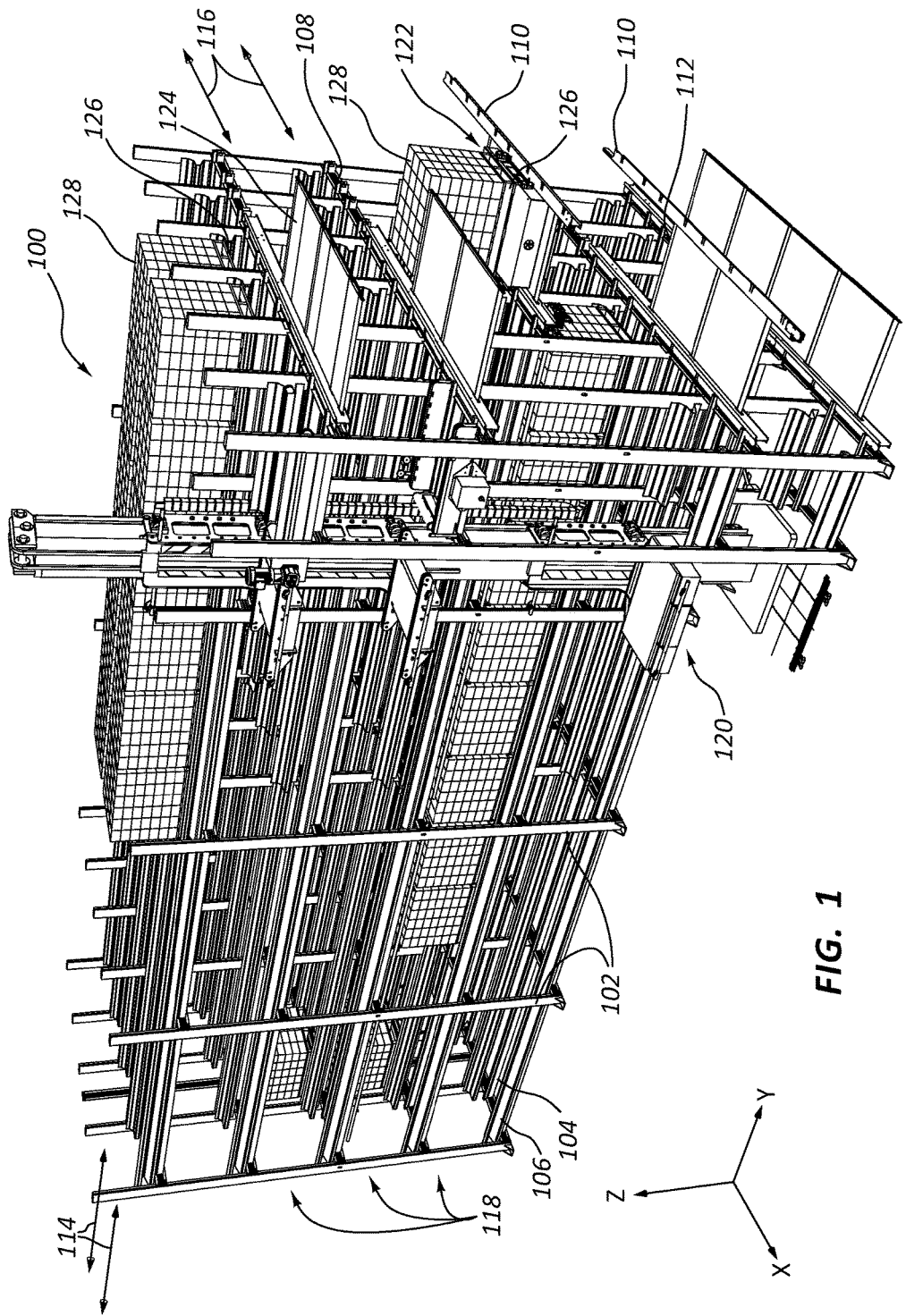
FIG. 1 is a perspective view of a storage structure according to an embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to a pallet storage support structure and related accessory features and systems for such support structures. The support structure may include a plurality of tiers or levels that each include a plurality of pallet storage rows and at least one aisle providing access to the rows. A plurality of automated row carts and aisle carts provide transport of pallets with associated loads throughout the support structure. The support structure may include a variety of pre-formed features that promote improved assembly schedules for the support structure and its accessory features and systems. Some example accessory features and systems for the support structure include fire suppression systems, lighting systems, power transfer systems, cart alignment/connection systems, safety harness connection systems, and the like, at least some of which may benefit from the pre-formed features.

The present disclosure provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Referring now to the figures in detail, FIG. 1 shows a perspective view of a storage structure 100 for use in an automated storage facility. The storage structure 100 may comprise vertical columns 102 connected to each other by row cart rails 104, row load rails 106, and row spacing members 108. The row cart rails 104 support row carts 206 (see FIG. 2). The row load rails 106 support pallets 126 on which loads 128 are stored.

The storage structure 100 also includes a plurality of aisle rails 110 with aisle rail spacing members 112 positioned therebetween. The aisle rails 110 are arranged generally perpendicular to the row cart rails 104 and row load rails 106. The aisle rail spacing members 112 are arranged generally parallel with the row cart rails 104 and row load rails 106, and the row spacing members 108 are arranged parallel with the aisle rails 110. FIG. 1 shows an aisle rail 110 associated row rails 104 with a given tier 118. At least some of the aisle rails 110 are incomplete or partially missing for some of the tiers 118. At least some of the grating 124 extending between pairs of the aisle rails 104 is removed in FIG. 1 in order to more clearly see other features of the storage structure 100.

The storage structure 100 provides a plurality of rows 114 defined by the row cart rails 104 and row load rails 106, a plurality of aisles 116 defined by the aisle rails 110, and a plurality of tiers or levels 118 that each include at least one row 114 and one aisle 116. An elevator assembly 120 transports pallets 126, which carry loads 128, to and from various tiers 118. Aisle carts 122 move the pallets 126 with loads 128 along the aisles 116 to and from elevator assembly 120 and between rows 114. Row carts 206 (see FIG. 2) move the pallets 126 with loads 128 to and from the aisle carts 122 along the row cart rails 104. Generally, the row cart rails 104 extend in a Y direction, the aisle rails 110 extend an X direction, and the tiers 118 are separated in a Z direction.

The row load rails 106, alone or in combination with the row cart rails 104, provide interconnection of vertical columns 102. The storage structure 100 may be assembled without the use of additional support structures extending between the vertical columns in the Y direction except for the row cart rails 104 and/or row load rails 106. The storage structure 100 may provide interconnection of the vertical columns 102 in a lateral or X direction without the use of additional support structures besides the row spacing member 108. The row spacing members 108 may support the aisle rails 110 in addition to the row cart rails 104. Additional details concerning these and other features of the storage structure 100 related to assembly of the vertical columns 102, row cart rails 104, row load rails 106, row spacing members 108 and aisle rails 110 are disclosed in U.S. Patent Application No. 62/089,738, filed on 9 Dec. 2014 and entitled "Structure for Automated Pallet Storage and Retrieval," which is incorporated herein in its entirety by this reference.

The design of storage structure 100 may support a compact storage system since only a small amount of space is needed between the loads 128 in the X direction to accommodate the thickness of the vertical columns 102, row cart rails 104 and row load rails 106. The space between loads 128 in the Z direction may also be minimized due to the relativity small amount of structure located between the tiers 118 in the form of the row spacing members 108, which overlap with the row cart rails 104. For example, space is saved because the row cart rails 104 and row load rails 106 do not need to be mounted to redundant horizontal members.

While traditional rack structures are adjustable so that the distances between vertical columns and horizontal members may be adapted to many different sized loads, the storage structure 100 of the present disclosure may be specifically designed to fit a certain size or width of load since in an automated warehouse, row carts, aisle carts, pallets and elevator device are usually only one universal size in each warehouse. Thus, the distance between row cart rails 104 and aisle rails 110 may be consistent throughout the storage structure 100 to accommodate a single size of row carts 206, aisle carts 122, and pallets 126. The adjustability of traditional storage rack structures allows single shelves or tiers storage space to be adjusted if needed. This is beneficial when each position is loaded individually by a forklift vehicle. However, in a structure for automated vehicles, the elevation of all load pallet positions in a single level may beneficially be the same because non-uniform pallet positions may prevent automated access to all rails. Furthermore, converting a traditional storage structure to an automated storage structure is typically expensive. Doing so requires converting tiers that have various heights to have the same vertical positions, and this can only be done with great expenditure of labor and additional new rail-related materials. The conversion also eliminates the adjustability of the storage structure. In the end, cost savings realized by the adjustability of the original installation may be lost and further changes to the converted structure are not allowed. For these reasons, it may be beneficial to implement a storage structure of the present disclosure that eliminates adjustable tiers and superfluous support members in favor of a more minimal, yet structurally sound, storage facility that can still provide support for automated load-moving vehicles (e.g., aisle carts 122 and row carts 206).

Figure 2:
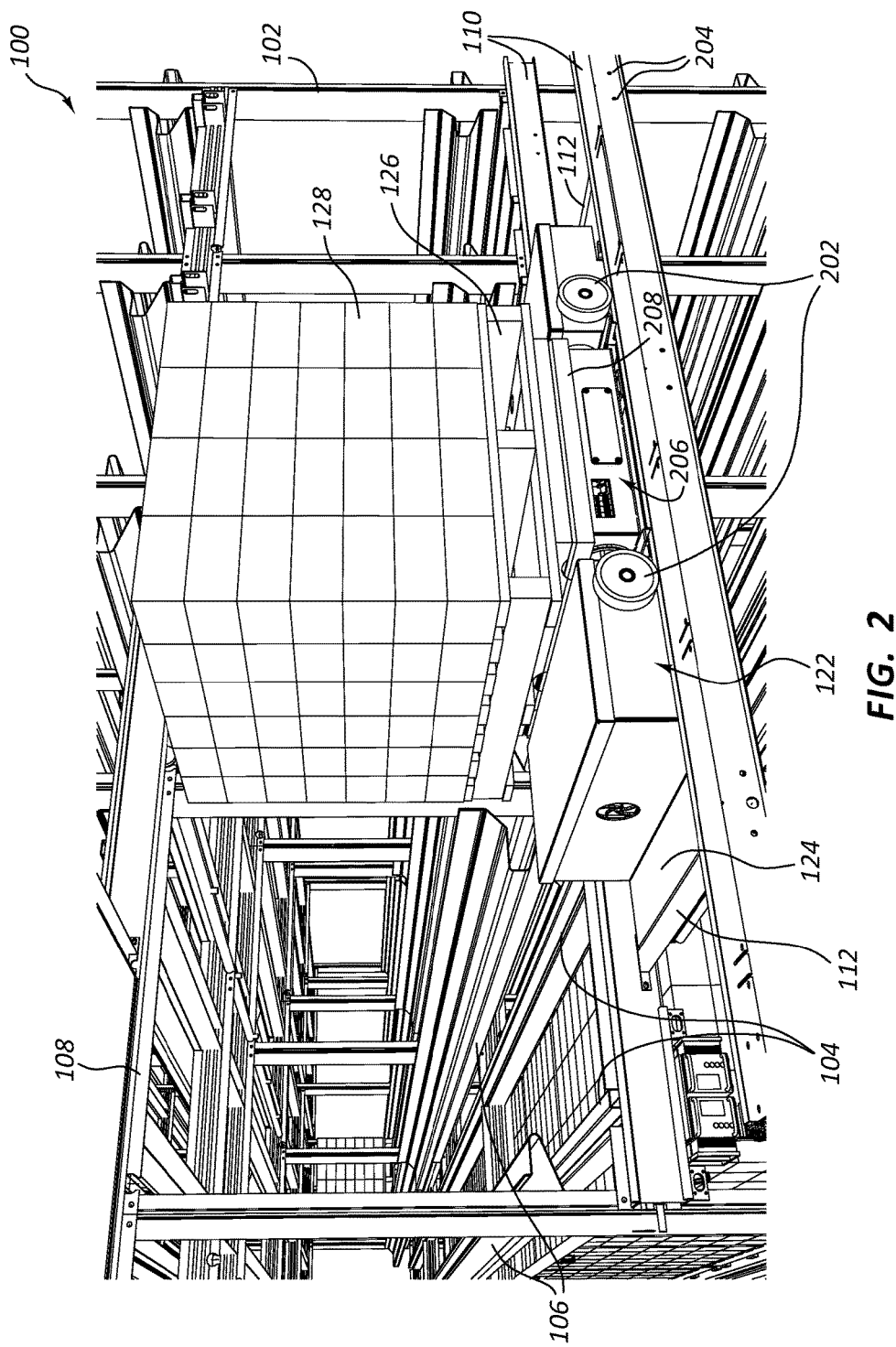
FIG. 2 is a perspective view of a portion of a storage structure shown in FIG. 1, including an aisle cart carrying a row cart and a loaded pallet.
Figure 3:
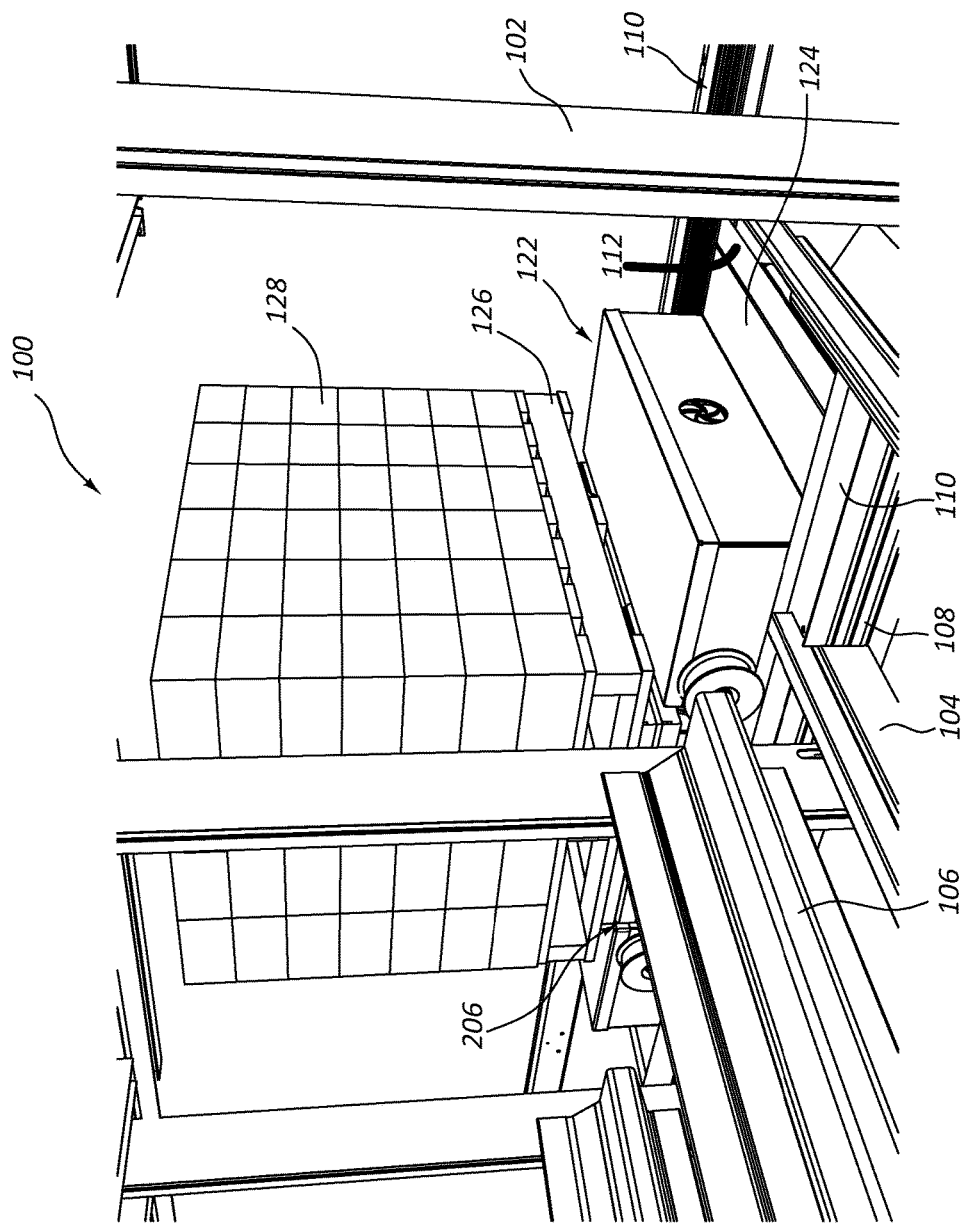
FIG. 3 is a perspective view of the storage structure shown in FIG. 1, including an opposite view of the aisle cart carrying a row cart and a loaded pallet.

FIGS. 2 and 3 show close-up perspective views of the storage structure 100 including the aisle cart 122 and row cart 206. The row cart 206 is positioned and carried on the aisle cart 122. Row cart 206 includes a lift structure 208 having a support surface that supports pallet 126 with load 128. Row cart 206 operates to raise and lower the pallet 126 relative to the row cart rails 104. Aisle cart 122 moves along aisle rails 110 until the row cart 206 is aligned with a pair of row cart rails 104. Lift structure 208 then operates to raise the pallet 126 above a support surface of row load rails 106, and row cart 206 moves onto the row cart rails 104 to position the pallet 126 with load 128 at a desired location along the length of the row load rails 106. Lift structure 208 then operates to lower the pallet 126 with load 128 onto the support surfaces of the row load rails 106, and row cart 206 returns to aisle cart 122. One aisle cart 122 may operate in conjunction with a plurality of row carts, wherein a separate row cart 206 operates with one or more rows 114. Typically, only a single row cart 206 is positioned within a given row 114 at a time. A row cart 206 may wait within a given row 114 until an aisle cart 122 is made available to carry the row cart 206 to a different row 114, or to the elevator assembly 120 to be transported to a different aisle 116.

A pair of the row cart rails 104 arranged to receive row carts 206 may be mirror images of each other. Similarly, a pair of row load rails 106 arranged to receive a pallet 126 with load 128 may be mirror images of each other. A pair of aisle rails 110 arranged to receive an aisle cart 122 may be mirror images of each other. Additional details regarding aisle rails 110 and their features are described in further detail below.

Figure 4:
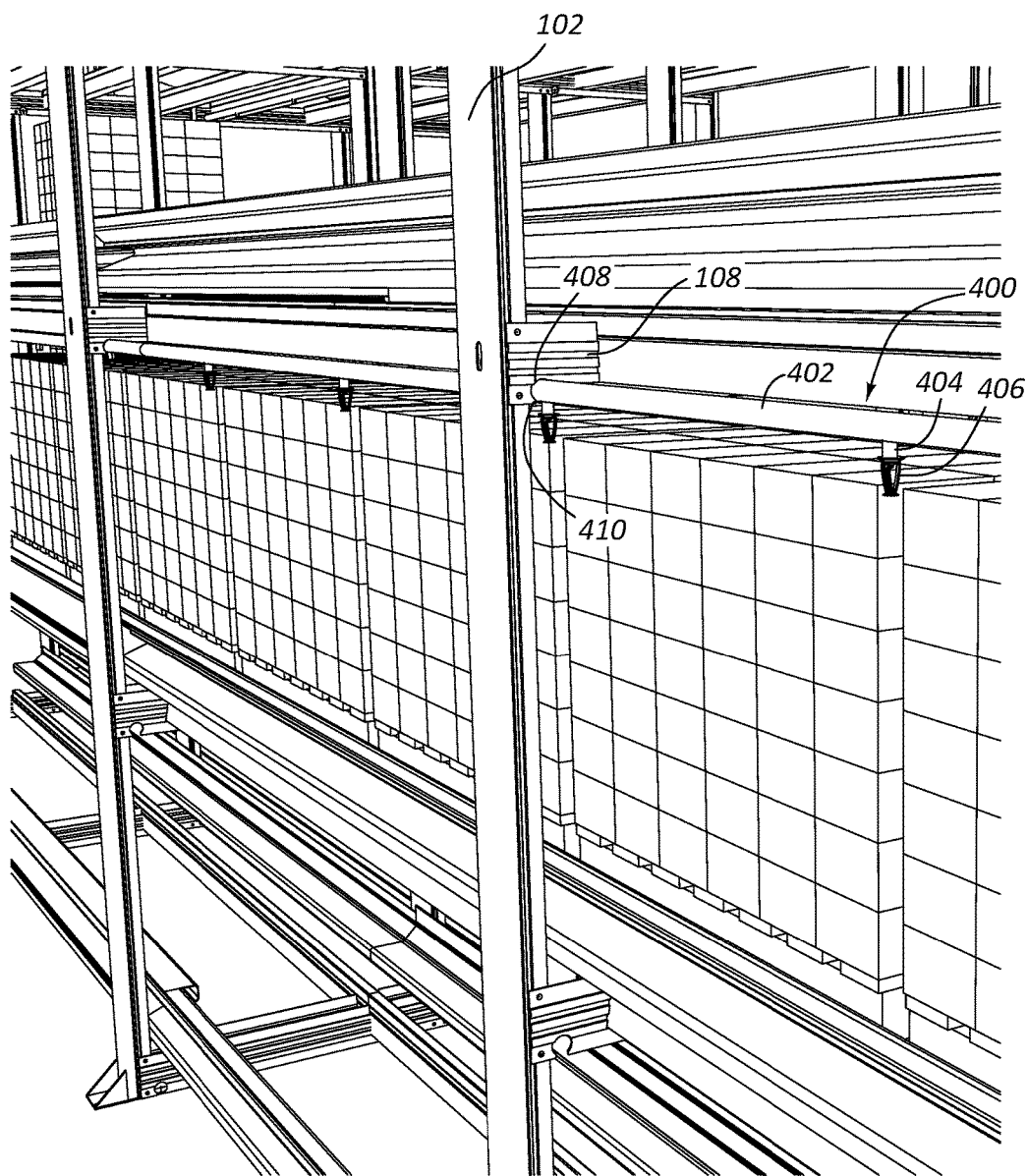
FIG. 4 is a perspective view of another portion of the storage structure shown in FIG. 1, including a fire suppression system.
Figure 5:
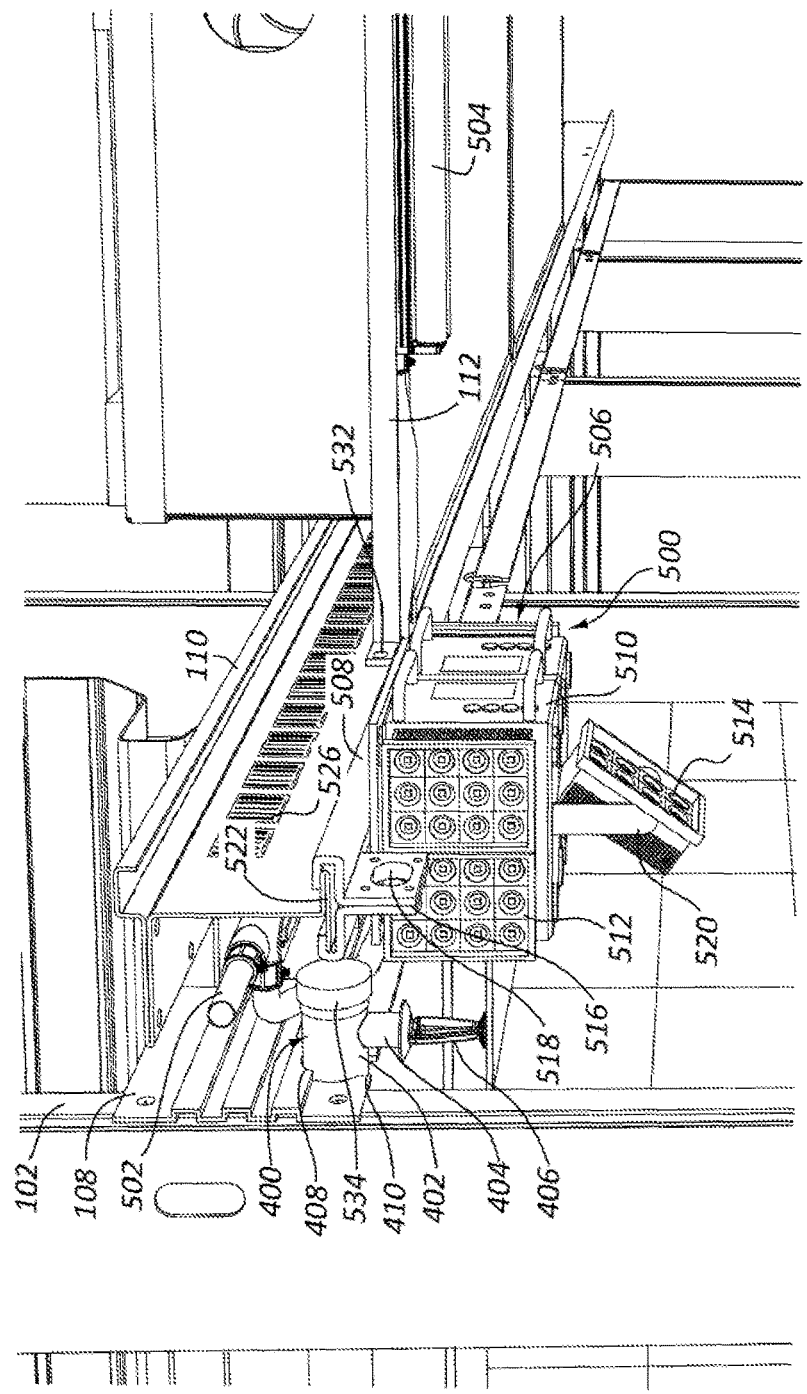
FIG. 5 is a perspective view of the storage structure shown in FIG. 1, including a mobile lighting assembly.

Referring now to FIG. 4, a fire suppression system 400 of the storage structure 100 is shown and described in further detail. The fire suppression system 400 includes piping 402 having a plurality of T-joints 404, and sprinkler heads 406 mounted to the T-joints 404. The piping 402 may be mounted to the row spacing members 108, which extend between vertical columns 102 in a lateral direction (e.g., X direction). An elongate pipe may extend along the length of an entire row 114. Piping 402 may extend along the rows 114 of multiple tiers 118. The piping 402 is shown extending along a lateral side of the vertical columns 102. FIG. 5 shows a cap 534 mounted at a termination point for piping 402. Other piping segments of fire suppression system 400 may extend in other directions such as, for example, vertically along one of the vertical columns 102, or extend horizontally through pre-formed holes formed in any of the row cart rails 104, row load rails 106, aisle rails 110, and the like.

Referring again to FIG. 4, the row spacing members 108 may include a piping aperture 408 and inlet opening 410 to accommodate the piping 402 and T-joints 404. The piping aperture 408 may have a width dimension $W_1$ (see FIG. 4a) that substantially matches an outer diameter of the piping 402. In the opening 410 may have width W2 (see FIG. 4a) that substantially matches a maximum width of the T-joint 404. The width W2 is less than the width $W_1$. As such, the piping 402 is held within piping apertures 408 as the piping 402 is fed longitudinally through a plurality of row spacing members 108. The width W2 permits the T-joints 404 to pass through the inlet openings 410 as the piping 402 is fed through each piping aperture 408.

The piping aperture 408 and inlet opening 410 may be pre-formed in the row spacing member 108 during manufacture of the row spacing member 108 (i.e., prior to assembly of storage structure 100). In one example, the row spacing members 108 are roll formed or extruded members and the piping aperture 408 and inlet opening 410 are pre-punched during manufacturing. The inlet opening 410 may extend to a peripheral edge of the row spacing member 108. The size and shape of the piping aperture 408 and inlet opening 410 may be modified to accommodate any desired size and shape for piping 402 and associated T-joints 404 or other coupling structures that provide mounting of sprinkler heads 406 to piping 402.

Providing a slide through arrangement for the fire suppression system 400 as part of mounting to row spacing members 108 may significantly reduce labor because separate pipe hangers are not required. The piping 402 may be installed after the vertical columns 102 are arranged vertically and already coupled to other vertical columns 102 with row spacing members 108, row cart rails 104 and row load rails 106. Alternatively, the piping 402 of fire suppression system 400 may be pre-assembled with sections of the storage structure 100 that include a plurality of longitudinally spaced apart vertical columns 102 with row spacing members 108, row cart rails 104 and row load rails 106 pre-assembled together lying flat on a floor surface before being tipped up for final assembly with other portions of storage structure 100 that are already in a vertically upright position. Such pre-assembly of a fire suppression system 400 is typically not possible when using pipe hangers. Accordingly, the fire suppression system 400 in combination with the pre-formed piping aperture 408 and inlet opening 410 of the row spacing members 108 may reduce overall schedule for assembling storage structure 100. Furthermore, these features related to the fire suppression system 400 and its assembly with storage structure 100 may facilitate maintenance repairs and the like. For example, cap 534 shown in FIG. 5 may be removed so that piping 402 can be pulled out longitudinally along row 114 and removed from an opposite end of row 114 from where aisle rails 110 are located without having to disconnect the individual piping segments from each other.

Figure 6:
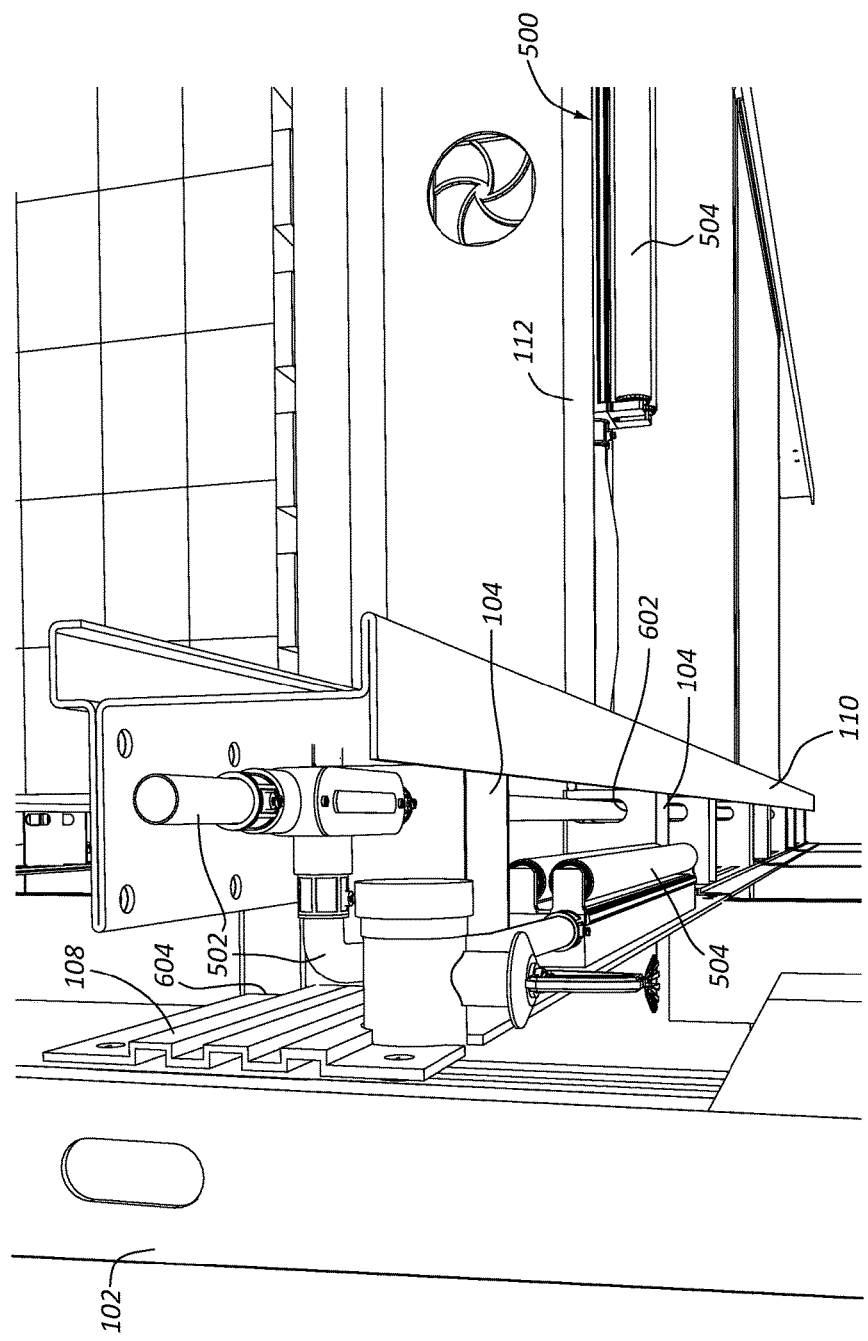
FIG. 6 is a perspective view of the storage structure shown in FIG. 1, including additional lighting systems features.

Referring again to FIG. 5, a lighting system 500 is shown and described. Lighting system 500 may include a plurality of electrical conduits 502 and at least one light fixture 504. Additional conduits 502 and light fixtures 504 are shown in FIG. 6 positioned at various locations in the storage structure 100. The conduit 502 may extend through holes formed in any of the vertical columns 102, row cart rails 104, row load rails 106, row spacing members 108 and aisle rails 110. FIG. 6 shows a plurality of conduit apertures 602 formed in the end portions of row cart rails 104. FIG. 5 shows a conduit aperture 530 formed in vertical column 102.

The light fixtures 504 may be mounted at any desired location including, for example, to the aisle rail spacing members 112 (see FIGS. 5 and 6) and to the row spacing members 108 (see FIG. 6). In other embodiments, the conduits 502, which carry electrical wiring to power the light FIG. 504, may be replaced with other types of wire carrying structures or wiring that does not require a wire conduit.

The conduit aperture 602 formed in row spacing members 108, as well as other conduit apertures formed in other structures such as the conduit aperture 530 formed in vertical column 102, may be pre-formed in those structures prior to assembly of the storage structure 100. In some examples, the conduit apertures may be formed using a stamping process. Other possible methods include milling, drilling, punching, cutting, and the like. Significant labor saving may be possible by being able to insert the electrical conduit through pre-formed holes formed in various support feature of storage structure 100 when conduit hangers are not required. Further, forming the conduit apertures as pre-formed apertures during manufacture of a given structure member may reduce time that may otherwise be needed to drill holes in those structural members during assembly of storage structure 100 and mounting of the lighting system 500 to the storage structure 100.

The conduit apertures may be formed with a shape and size that substantially matches an outer perimeter dimension of the conduit typically used for lighting system 500. In some embodiments, the conduit apertures may be formed with different shapes and sizes that permit additional adjustment of the conduit position, ease of assembly of the conduits, or accommodation of different sized and shaped conduit structures for various lighting system 500 designs.

The conduit apertures may be used for other purposes in additional to a lighting system and related electrical conduit. For example, the conduit apertures may be used to carry wiring or associated conduit for other purposes such as a local area network, sensor systems, powering of aisle carts 122 and/or row carts 206, control systems, and the like. In one embodiment, the conduit apertures may be also be used to receive piping 402 of fire suppression system 400.

Again referring to FIG. 5, a mobile lighting assembly 506 is shown and described. A mobile lighting assembly 506 may include a carriage 508, a battery pack 510, end light members 512, adjustable light members 514, and a swivel mount 520 for mounting the adjustable light members 514 to the carriage 508 and/or battery pack 510. The carriage 508 may slide along a T-flange 522 of aisle rail 110. Carriage 508 includes a track sized and shaped to mount to the T-flange 522. Carriage 508 may be arranged and configured to slide along a length of the aisle rail 110 to various longitudinal positions to provide a mobile lighting source for use, for example, during maintenance and/or operation of storage structure 100. In some embodiments, carriage 508 may include a low friction bearing surface such as, for example, a wear pad, bearings, rollers, or the like. Carriage 508 or T-flange 522 may comprise low friction materials, coatings of such low friction materials or coatings to reduce friction at the interface with T-flange 522.

Battery pack 510 may comprise one or more rechargeable batteries. The batteries may provide power for operating light members 512, 514. Battery pack 510 may provide a power source for other purposes such as, for example, powering maintenance equipment and the like. In one embodiment, storage structure 100 may include a recharging station positioned at one end of the aisle rails 110. The mobile lighting assembly 506 may be moved to the charging station and charged when not in use.

End light members 512 may be mounted to the carriage 508 and/or battery pack 510 at any desired location to provide lighting in specific directions. The end light members 512 and adjustable light members 514 may comprise low energy lighting such as, for example, LED lighting.

Swivel mount 520 may provide an adjustment in a position and/or orientation of adjustable light member 514. Swivel mount 520 provides adjustment of adjustable light member 514 about one axis of rotation. Other configurations are possible to provide additional adjustability of a position and/or orientation of the adjustable light members 514 (e.g., a ball and socket pivot structure that provide rotation about multiple rotation axes).

Carriage 508 may include a safety strap connection member 516 having an aperture 518. The connection member 516 may be used as an anchor point for a worker's safety strap while the worker is performing maintenance on storage structure 100. In one example, a worker may be able to attach a lanyard, which is attached to a fall protection harness being worn by the worker, to the connection member 516. The worker may be able to connect his lanyard and associated fall protection harness to a connection member 516 located at a tier 118 above where he is working, or within the tier that he is working (e.g., the worker is standing on the aisle rail 110 to which the carriage 508 is mounted). Storage structure 100 may include a plurality of carriages 508 that each comprise one or more connection members 516. The carriage 508 may or may not include a battery pack 510 and associated light members 512, 514. Some of the carriages 508 may be used solely for the connection member 516 mounted thereto. Providing a plurality of carriages 508 with connection members 516 on a single rail or pair of rails may permit a plurality of workers to have a connection point for their fall protection harnesses while working in a common area. A single aisle rail 110 may support a plurality of carriages 508 with connection members 516 mounted thereto. A single carriage 508 may include a plurality of connection members 516. Each connection member 516 may accommodate two or more safety straps, lanyards, harnesses, etc.

Providing the mobile connection members 516 mounted to carriages 508 may provide an improvement over former arrangements wherein a track is added to the upper portions of the aisle to accommodate safety tie-offs. The use of the safety strap connection members 516 disclosed herein may save labor and reduce overall schedule for building storage structure 100 and later maintenance of storage structure 100.

The mobile lighting assembly 506 may be used in combination with the lighting system 500 described with reference to FIGS. 4-5 above. Alternatively, one or the other of lighting system 500 and mobile lighting assembly 506 may be used. By using solely the mobile lighting assembly 506, a significant cost and time savings could be available by eliminating the need to provide lighting system 500 and its associated conduits, apertures, light fixtures, etc. Typically, the light provided by lighting system 500 and/or mobile lighting assembly 506 is most needed during assembly of storage structure 100 and maintenance thereof. The lighting is typically only required when a worker is in the area. Since a worker is typically required to tie-off with a safety harness to a secure point while performing work in a particular portion of storage structure 100, providing a mobile lighting unit along with the mobile connection member 516 may address both the lighting and the safety needs for a given worker.

FIG. 6 shows row cart rails 104 include mounting slots 604 that slide over the row spacing members 108 to provide a positive connection and support for the row cart rails 104. The mounting slots 604 may extend to and be open along a bottom edge of row cart rails 104 for easy insertion of row spacing member 108. The mounting slots 604 may be pre-formed in row cart rails 104 to match a specific row spacing member 108 design. In other arrangements, a mating slot may be formed in row spacing member 108 to receive a portion of row cart rails 104.

Figure 7:
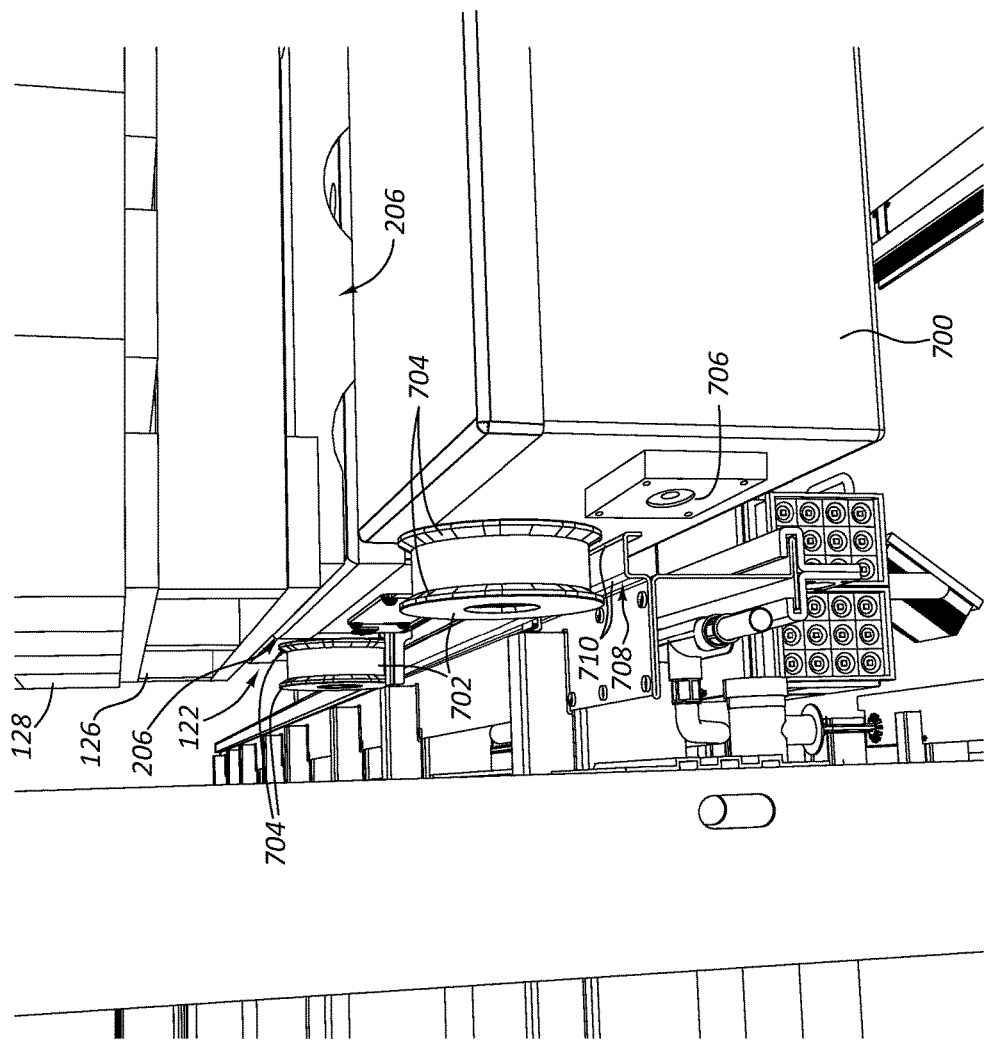
FIG. 7 is a close-up perspective view of a portion of the aisle cart carrying a row cart and a loaded pallet shown in FIG. 2.

Referring now to FIG. 7, the aisle cart 122 is shown in further detail. Aisle cart 122 includes a base 700, a pair of double flange wheels 702 each having a pair of flanges 704, a pair of no-flange wheels 202 (see FIG. 2), a power collector 802 (see FIG. 8), and a position sensor 706. The double flange wheels 702 and no-flange wheels 202 ride along wheel tracks 708 of the aisle rails 110. Wheel tracks 708 include inner and outer radius surfaces 710. The flanges 704 of double flange wheels 702 extend around the radius surfaces 710 and contact opposing side surfaces of the wheel track 708 to maintain connection of the aisle cart 122 with its associated aisle rail 110. The no-flange wheels 202 are able to move laterally relative to the wheel track 708 to account for variations in distance between a pair of the aisle rails 110 along the length of aisles 116. The use of double flange wheels on one side of the aisle cart 122 may help eliminate "crabbing" problems found in vehicles with single flanges on all four wheels (e.g., on wheels positioned on opposite sides of the aisle cart 122). The problem of "crabbing" relates to the wheels spreading laterally outward due to lateral pressures imposed on the wheels and their respective flanges caused by variations in spacing between the aisle rails 110. In at least some examples, crabbing may result in one or more of the cart wheels moving off of the wheel track 708 of a respective aisle rail 110, or at least additional wear occurring on the flanges 704. When all wheels of the aisle cart 122 include a single flange, misalignments of the aisle rails 110 (i.e., resulting in non-parallel and/or non-coplaner orientations) may cause the flanges to bind against the wheel track 708 or the entire aisle cart 122 to be turned slightly. As a result, wear to the flanges may be accelerated and/or the position sensor 706 may misread a location of the aisle cart.

When two double flanged wheels 702 are provided on one side of the aisle cart 122 with no-flange wheels 202 positioned on an opposite side of the aisle cart 122, the aisle cart 122 may be better able to maintain a fixed position laterally relative to the wheel track 708 upon which the double flanged wheels 702 are supported with limited lateral forces being applied to the flanges. When the position sensor 706 is located on the same side of the cart as the double flanged wheels 702, the position sensor 706 may be better able to accurately determine a position of the aisle cart 122 relative to the wheel track 708 on that side of the aisle cart 122. As mentioned above, the no-flange wheels 202 are able to move laterally relative to the wheel track 708 upon which flange wheels 202 are supported to avoid application of lateral forces to the flanges 704 on the double flanged wheels 702.

Providing the wheel track 708 with radius surfaces 710 may reduce friction between the flanges 704 and the wheel track 708 as compared to other wheel track 708 designs. The radius surfaces 710 may be formed with significant precision and accuracy so as to reduce friction at the interface with double flanged wheels 702.

Figure 8:
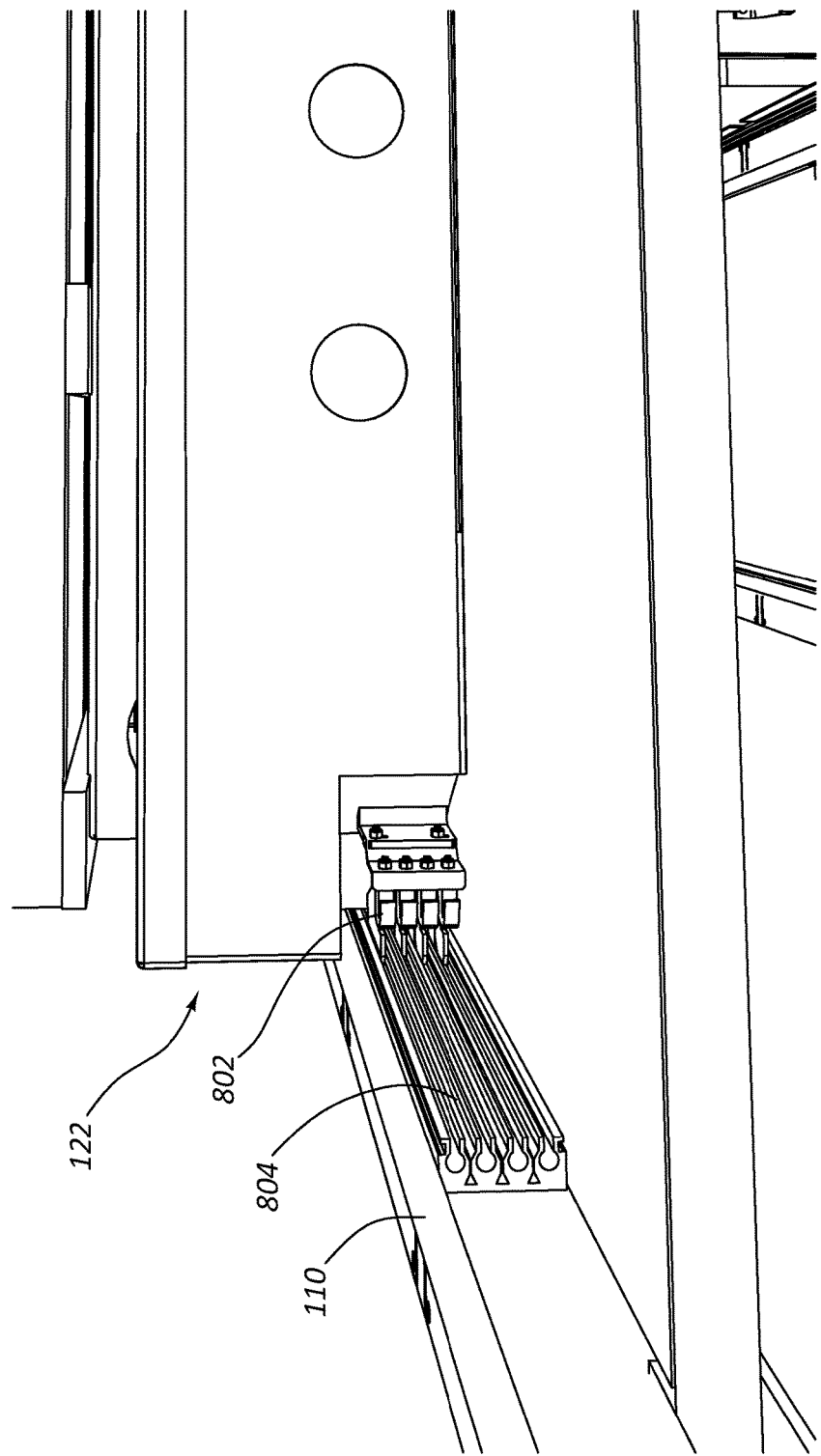
FIG. 8 is close-up perspective view of another portion of the aisle cart shown in FIG. 2.

The power collector 802 (see FIG. 8) interfaces with a power track 804 that is mounted to at least one of the aisle rails 110 (see FIG. 8). The power track 804 may transfer electrical power to the power collector 802 for operation of aisle cart 122. FIG. 8 shows a single power collector 802 positioned on a single side of aisle cart 122 for interaction with a power track 804 positioned on just one of the aisle rails 110 of the pair of aisle rails that support aisle cart 122. Other embodiments are possible including, for example, using more than one power collector 802 on a single aisle cart 122, providing the power collectors 802 on both sides of the aisle cart 122, and the like. The aisle rails 110 may include a plurality of pre-formed holes that are used to mount the power collector's power tracks 804 and/or power collectors 802. The pre-formed holes may be formed during manufacture of the aisle rails 110 prior to be delivered to an installation site.

Position sensor 706 may be mounted to base 700 of aisle cart 122 at a position and with a given orientation that permits interaction with a position locating feature mounted at another location on storage structure 100. For example, position sensor 706 may be mounted on a side surface of base 700, as show in FIG. 7, and oriented facing a bar code 526 positioned along an inner surface of aisle rail 110, as shown in FIG. 5. Position sensor 706 may "read" the bar code 526 to determine a location of the aisle cart 122 along the length of aisle rail 110. Many other types of position sensors are possible including, for example, an RF transmitter/receiver, a laser, and the like. Additional details regarding position sensors and related methods of determining a position of an automated cart in a storage structure 100 are disclosed in U.S. Patent Application No. 61/931,416, filed on 24 Jan. 2014 and entitled "Apparatus for Positioning and Automated Lift Storage Cart and Related Methods," and U.S. Patent Application No. 61/948,311 filed, on 5 Mar. 2014 and entitled "Automated Lifting Storage Cart," both of which are incorporated herein in their entireties by this reference.

The bar code 526 shown in FIG. 5 includes a plurality of bar codes positioned adjacent to each other along the length of aisle rail 110. Other embodiments may include bar codes that are positioned further spaced apart than those shown in FIG. 5. Other embodiments utilize other technology including, for example, transceivers and other active sensor devices. In one embodiment, the bar codes 526 may be replaced with a passive sensor that is energized upon receiving a signal from position sensor 706, and the passive sensor generates a signal once energized. In some embodiments, the aisle cart 110 may include a bend or other feature formed in a sidewall thereof to assist in locating the bar code 526 at a proper elevation for sensor 706 to read properly.

Figure 9:
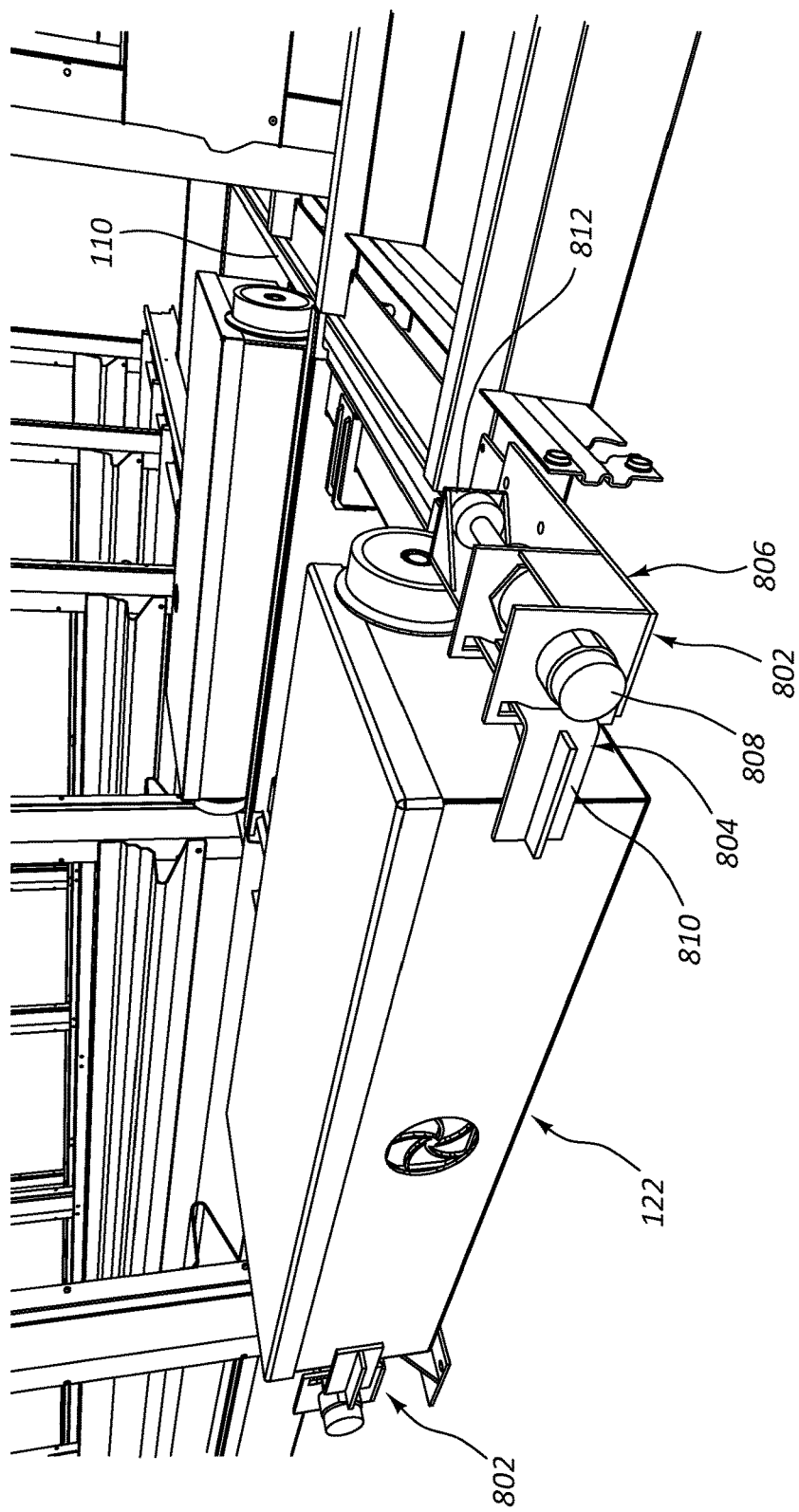
FIG. 9 is a top perspective view of an aisle cart stop feature of a storage structure in accordance with the present disclosure.
Figure 10:
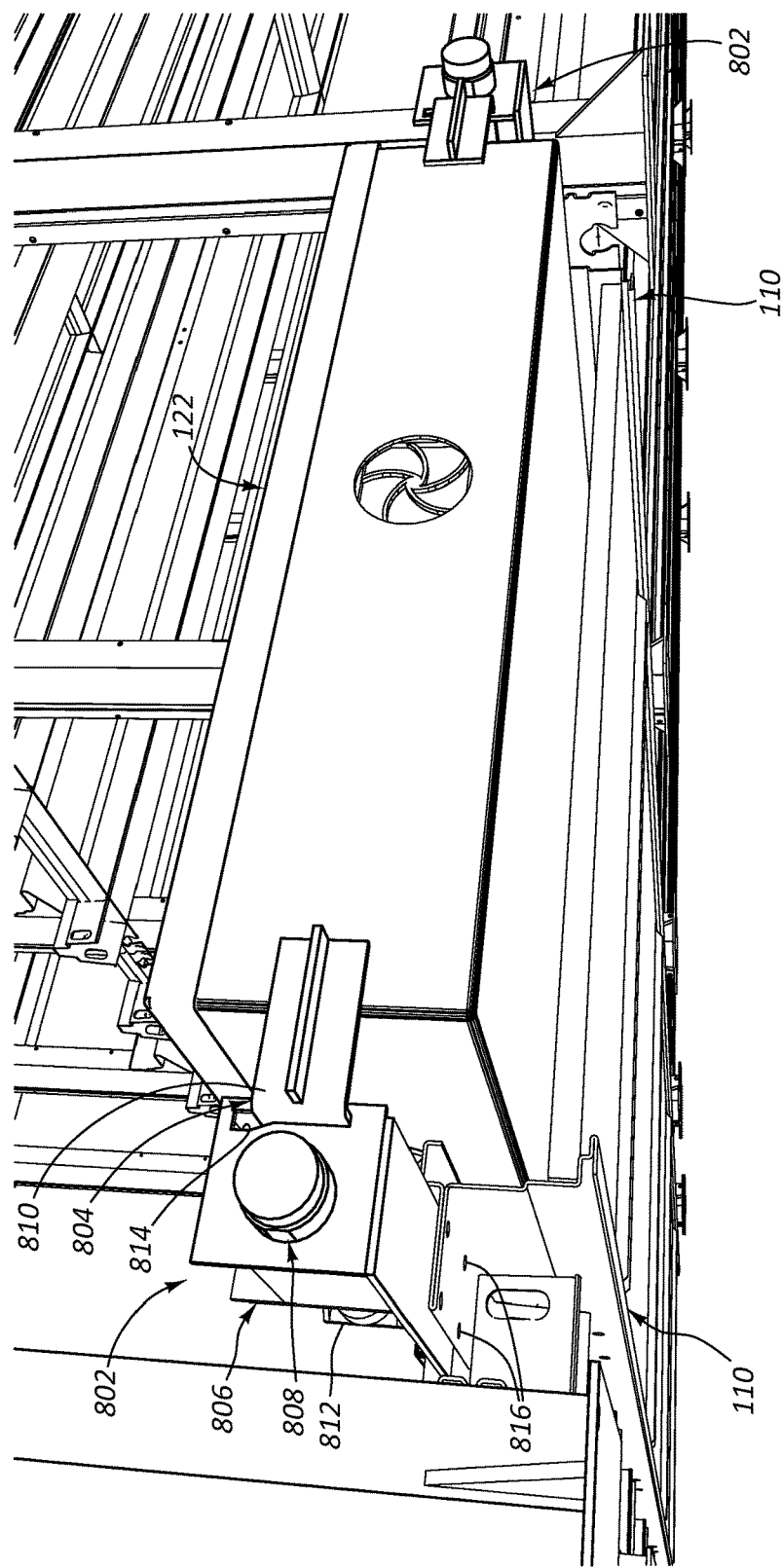
FIG. 10 is a bottom perspective view of the aisle cart stop feature shown in FIG. 9

FIGS. 9 and 10 show a pair of aisle cart stop assemblies 802 for use with the storage structure 100 described above. The aisle cart stop assemblies 802 may provide a position stop for the aisle carts 122 disclosed herein. The aisle cart stop assemblies 802 may provide as a safety feature that helps ensure that the aisle carts 122 remain positioned on the aisle rails 110 (i.e. do not unintentionally roll of an end of the aisle rails 110), such as during an equipment failure or the like. The aisle cart stop assemblies 802 may be separately mounted to individual aisle rails 110, such as at an end portion of the aisle rails 110 as shown in FIG. 10. The aisle cart stop assemblies 802 may each include a stop member 804, a mounting bracket 806, and a shock absorber 808, which provides improved deceleration of the aisle cart 122 upon contact with the stop member 804.

The stop member 804 may include an abutment portion 810 that is arranged to contact the aisle cart 122 to stop longitudinal movement of the aisle cart 122 at a predetermined location along a length of the aisle rails 110. The stop member 804 may also include an attachment portion 812 that is coupled to the mounting bracket 806. The attachment portion 812 may be coupled to the mounting bracket 806 with the shock absorber 808. In at least some embodiments, the stop member 804 may include one or more 90° angled portions, wherein the abutment portion 810 extends at a 90° angle relative to other portions of the stop member 804.

The mounting bracket 806 is mounted to an individual aisle rail 110 via, for example, a plurality of mounting holes 816 formed in the aisle rails (see FIG. 10). The mounting holes 816 may be formed in the aisle rails 110 during manufacture of the aisle rails and/or at a time and/or location prior to assembling the storage structure 100. The mounting bracket 806 may include one or more support slots 814 through which at least a portion of the stop member 804 extends. The support slots 814 may orient the stop member 804 in an upright position with the abutment portion 810 arranged in a path of movement of the aisle cart 122. The support slots 814 also allow stop member 804 to slide parallel to the travel of aisle cart 122 and parallel to a deceleration force provided by shock absorber member 808.

The shock absorber 808 is operably interposed between the stop member 804 and the mounting bracket 806. The adjustment member 808 may operate to move the stop member 804 axially (e.g., longitudinally) relative to the mounting bracket 806 and associated aisle rail 110 to which the mounting bracket 806 is mounted. The shock absorber 808 may be connected at one end to the stop member 804 and at an opposite end to the mounting bracket 806. In at least some embodiments, the shock absorber 808 may have a length adjustment feature which when actuated moves portions of the stop member 804 towards or away from portions of mounting bracket 806 to adjust a stop position for aisle cart 122. The shock absorber 808 may be adjustable to increase or decrease a shock absorbing property of the shock absorber.

The aisle cart stop assembly 802 may extend longitudinally from a free end of the aisle rail 110 to which it is mounted (see FIG. 10). In other embodiments, the aisle cart stop assembly 802 may be mounted at any location along the length of the aisle rail 110 to which it is mounted to provide a longitudinal position stop for the aisle cart at any desired location along the length of the aisle rail 110.

The aisle cart stop assembly 802 may be pre-assembled to aisle subassemblies constructed flat on a floor surface and then lifted and set in place similar to the fire suppression piping and lighting systems disclosed herein. Providing pre-assembly of the aisle subassemblies may provide time savings as compared to separately bolting aisle rail, cross members, grating, and aisle cart stop assemblies 802 in place by carrying them up to each level individually.

In further embodiments, the aisle cart stop assembly 802 may be configured and arranged to be used on one of the row rails 102 of the storage structure 100 instead of on an aisle rail 110. The aisle cart stop assembly 802, when mounted to a row rail 102, may provide a longitudinal position stop for a row cart 206 that moves along the row rails 102. The aisle cart stop assemblies 802 may function as a safety feature that helps ensure that the row carts 206 remain positioned on the row rails 102 (i.e., does not unintentionally roll off an end of row rails 102), such as during an equipment failure or the like.

Various methods of operating components of storage structure 100, methods of assembling at least portions of storage structure 100, and methods of storing palleted loads 128 using the storage structure 100 may be possible in accordance with the present disclosure. According to one embodiment, a plurality of piping apertures are formed in row spacing members 108 of a storage structure 100. The piping apertures 408 may be pre-formed during manufacture of the row spacing member 108 itself. The row spacing members 108 may be mounted to a vertical column 102 for use in the storage structure. A plurality of vertical columns 102 may be interconnected with one or more row load rails 106 and/or row cart rails 104 while the vertical columns 102 are arranged horizontally on a ground surface. A piping member 402 of a fire suppression system 400 may be inserted through the piping apertures 408 prior to or after rotating the vertical columns 102 into a vertical position. T-joints 404 of the fire suppression system 400 may extend through inlet openings 410 that are formed in the row spacing members 108 adjacent to and continuous with the piping apertures 408. The piping 402 and related T-joints 404 may be inserted longitudinally through the plurality of piping apertures 408 and inlet openings 410 of a plurality of row spacing members 108 that are mounted to the vertical columns 102 prior to or after rotating the vertical columns 102 into a vertical position.

Another example method relates to mounting a lighting system to a storage structure 100. The method may include pre-forming a plurality of conduit apertures 530, 602 in various structural components of the storage structure 100 including, for example, vertical columns 102, row cart rails 104, row load rails 106, row spacing members 108 and aisle rails 110. After assembling the structural elements of the storage structure 100 together, the method may include inserting one or more electrical conduits 502 through the conduit apertures. The method may also include mounting one or more light fixtures to at least one of the structural elements of the storage structure 100, and connecting the light fixtures to wiring that extends through the conduit.

A further method is directed to providing a mobile lighting assembly and/or providing lighting at a workspace at a storage structure 100. The mobile lighting assembly may include a carriage 508 to which one or more light members is mounted. The mobile lighting assembly 506 may include a battery pack 510 to power the lighting members. The carriage may be movable along one or more structural members of the storage structure 100 such as, for example, a T-flange 522 of an aisle rail 110. The mobile lighting assembly 506 may be moved along the structural element to a desired location. One or more of the lighting members may be adjustably mounted to the carriage 508 to direct light in a specific direction. The mobile lighting assembly 506 may be powered via the battery pack or a hard wired connection.

A further method may be directed to providing a mobile safety strap connection member for a storage structure 100. A safety strap connection member 516 may be mounted to a carriage 508 that is supported on one or more structural members of the storage structure 100 (e.g., a T-flange 522 of an aisle rail 110 or a portion of row rails 104). The connection member 516 may provide a connection point for a lanyard of a worker's safety harness. The connection member 516 may be moved to a workspace by sliding the carriage 508 along the structural member (e.g., aisle rail 110). A plurality of carriages and associated connection members 516 may be positioned along a single structural element (e.g., aisle rail 110) to facilitate a safety connection for a plurality of different workers operating in a common workspace. A single carriage 508 may include a plurality of safety strap connection members 516.

A yet further method is directed to a method of maintaining connection of an automatic vehicle and/or cart of a storage structure to one or more wheel tracks/rails of the storage structure 100. In one example, the automated vehicle is an aisle cart 122 that rides upon wheel tracks 708 of a pair of aisle rails 110. Wheels along one side of the aisle cart 122 may each include a pair of flanges 704 that ride along opposing side surfaces of the wheel track 708 and maintain contact with a radius surface 710 of the wheel track 708. Wheels along an opposing side of the aisle cart are free of flanges and may move laterally relative to the wheel track 708 upon which the no-flange wheels 202 are supported. The double flanged wheels 702 with flanges 704 maintain a connection of the aisle cart 122 to the aisle rails 110 without significant lateral forces being applied to the flanges 704 even in the presence of variations in spacing between the pair of aisle rails 110 along their lengths. The wheels with flanges may be exchanged with wheels free of flanges (e.g., switch with wheels on an opposite side of the aisle cart 122).

Other methods in accordance with the present disclosure relate to assembling portions of the storage structure 100 and/or creating subassemblies of the storage structure 100 as part of assembling the entire storage structure 100. In one example, a first subassembly is formed with a plurality of longitudinally spaced vertical columns 102 that are connected together with a plurality of row load rails 106. This first subassembly may be assembled while lying flat on a ground surface an then later rotated/tilted into an upright position awaiting connection to another subassembly of components.

A second subassembly may include a plurality of longitudinally spaced apart vertical columns 102 that are interconnected with a plurality of row load rails 106. A plurality of row spacing members 108 are also connected to the vertical columns 102, and a pair of row cart rails 104 are connected to each row spacing member 108. The second subassembly may be assembled while its vertical columns 102 are lying flat on a ground surface and then later rotated/tilted up into an upright position and arranged adjacent to the first subassembly. The row spacing members 108 are then connected to the vertical columns 102 of the first subassembly.

A third subassembly that is substantially identical to the second subassembly may be assembled while its vertical columns 102 are lying flat on a ground surface and then rotated/tilted up into an upright position adjacent to either the first subassembly (on an opposite side from the second subassembly) or the second subassembly and connected to the vertical columns 102 of the first or second subassembly. This assembly process can be repeated with additional subassemblies that are similar to the second and third subassemblies to create the desired number of rows and a total width of the storage structure 100. Additionally, assemblies of first, second, third, etc. subassemblies may be stacked vertically to create a desired number of tiers and total height for the storage structure 100.

A fourth subassembly may be formed with a plurality of aisle rails 110 and aisle rail spacing members 112. A plurality of grating members 124 may also be connected to the aisle rails 110 and/or aisle rail spacing members 112 as part of the fourth assembly. Each fourth subassembly may also include at least one aisle cart stop assembly 802. The fourth subassembly may be mounted to the row cart rails 104 and/or row spacing members 108 of the second or third subassemblies. The fourth subassembly may be interposed between two separate assemblies that each include first, second, third, etc. subassemblies.

Formation of subassemblies as part of constructing storage structure 100 may provide a number of efficiencies related to, for example, being able to assemble components of the subassembly while those components are arranged on a ground surface before being oriented in an upright position. Further, all components of a given subassemblies may be moved (e.g., rotated) into an upright position in a single movement/step rather than having to lift and position each individual component separately.

The pre-formed apertures, slots (e.g., mounting slots 604), etc. formed in the vertical columns 102, row cart rails 104, row load rails 106, row spacing members 108, aisle rails 110, and aisle rail spacing members 112 may facilitate easier assembly of components of a given subassembly, and may facilitate easier connection of one subassembly to another subassembly. In at least some embodiments, some subassemblies may be able to achieve a positive connection with another subassembly without the use of fasteners, welding, or the like because of the pre-formed apertures, slots, etc.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A multi-level storage structure, comprising:
   a plurality of spaced apart vertical supports;
   a plurality of row spacing members connected to and laterally spacing apart the vertical supports;
   a plurality of row rails connected to and longitudinally spacing apart the vertical supports, the row rails being configured to support at least one row cart;
   a plurality of aisle rails extending perpendicular to the plurality of row rails and configured to support at least one aisle cart; and
   a plurality of pre-formed holes formed in at least one of the vertical supports, row spacing members, row rails, and aisle rails to mount, and a fire suppression system, the plurality of pre-formed holes being formed prior to assembly of the storage structure and including a first portion extending to an edge of the at least one of the vertical supports, row spacing members, row rails, and aisle rails, and a second portion formed continuous with and wider than the first portion.

2. The multi-level storage structure of claim 1, wherein the plurality of row spacing members include the plurality of pre-formed holes.

3. The multi-level storage structure of claim 1, wherein the plurality of pre-formed holes are at least one of stamped and punched holes formed during manufacture of the in at least one of the vertical supports, row spacing members, row rails, and aisle rails.

4. The multi-level storage structure of claim 1, further comprising a plurality of load rails extending parallel to the plurality of row rails and configured to support at least one loaded pallet, the plurality of pre-formed holes being formed by stamping or punching during manufacture of the plurality of load rails.

5. A multi-level storage structure, comprising:
   a plurality of vertical supports;
   a plurality of row rails connecting vertical posts positioned longitudinally relative to each other and configured to support at least one row cart;
   a plurality of load rails extending parallel to the plurality of row rails and configured to support at least one loaded pallet;
   a plurality of aisle rails extending perpendicular to the plurality of the row rails and configured to support at least one aisle cart;
   a carriage mounted to a flange portion of at least one of the plurality of aisle rails, the flange portion having inverted T-shape construction and the carriage being configured to move longitudinally along a length of the at least one of the plurality of aisle rails.

6. The multi-level storage structure of claim 5, wherein the at least one of the plurality of aisle rails includes a wheel support surface along a top portion thereof, and the flange portion along a bottom portion thereof.

7. The multi-level storage structure of claim 5, wherein the wheel support surface includes inner and outer radius surfaces.

8. The multi-level storage structure of claim 5, further comprising at least one lighting member mounted to the carriage.

9. The multi-level storage structure of claim 5, further comprising at least one rechargeable battery mounted to the carriage.

10. The multi-level storage structure of claim 5, further comprising at least one lighting member pivotally mounted to the carriage.

11. The multi-level storage structure of claim 5, wherein the carriage further includes a safety harness mounting bracket configured to secure a worker's safety harness.

12. A multi-level storage structure, comprising:
a plurality of vertical supports;
a plurality of row rails connecting vertical posts positioned longitudinally relative to each other and configured to support at least one row cart;
a plurality of load rails extending parallel to the plurality of row rails and configured to support at least one loaded pallet;
a plurality of aisle rails extending perpendicular to the plurality of row rails and configured to support at least one aisle cart;
a plurality of row spacing members connecting vertical posts positioned laterally relative to each other, the plurality of row spacing members comprising pre-formed holes;
a fire suppression system positioned in the pre-formed holes of the plurality of row spacing members and comprising:
a plurality of pipes;
a plurality of T-joints extending from at least some of the plurality of pipes;
a plurality of sprinkler heads mounted to at least some of the plurality of T-joints,
wherein the pre-formed holes include a joint portion extending to an edge of the plurality of row spacing members and sized to have the T-joint pass therethrough, and a pipe portion formed continuous with the joint portion and sized to have the pipe pass therethrough.

13. The multi-level storage structure of claim 12, wherein the plurality of pipes with T-joints and sprinkler heads are insertable through the pre-formed holes during assembly of the storage structure.

14. The multi-level storage structure of claim 12, wherein the pipe portion has a greater maximum width dimension than a maximum width dimension of the joint portion.

15. The multi-level storage structure of claim 12, wherein the plurality of aisle rails are mounted directly to the plurality of row rails, and the plurality of row rails being connected directly to the plurality of row spacing members.

16. A multi-level storage structure, comprising:
a plurality of vertical supports;
a plurality of row rails connecting vertical posts positioned longitudinally relative to each other and configured to support at least one row cart;
a plurality of load rails extending parallel to the plurality of row rails and configured to support at least one loaded pallet;
a plurality of aisle rails extending perpendicular to the plurality of the row rails and configured to support at least one aisle cart having a wheel support surface with inner and outer radius surfaces; and
a carriage mounted to a flange portion of at least one of the plurality of aisle rails, the carriage being configured to move longitudinally along a length of the at least one of the plurality of aisle rails.

17. The multi-level storage structure of claim 16, further comprising at least one automated aisle rail cart comprising:
a base structure;
a left set of wheels configured to contact a first said aisle rail;
a right set of wheels configured to contact a second said aisle rail; and
wherein the left set of wheels include inner and outer flanges that extend along inner and outer surface of the first rail, and the right set of wheels is free of flanges.

18. The multi-level storage structure of claim 17 wherein the automated aisle rail cart further comprises a power collector extending laterally from the base structure and arranged to engage a power track mounted to one of the first and second rails.

19. The multi-level storage structure of claim 17 wherein the automated aisle rail cart further comprises at least one position sensor mounted to the base structure and arranged to detect at least one position feature mounted to one of the first and second rails.

20. The multi-level storage structure of claim 19 wherein the at least one position feature includes a bar code.

21. The multi-level storage structure of claim 17 wherein the base structure includes a recessed portion sized to carry an automated row lift cart.

22. The multi-level storage structure of claim 17 wherein the right set of wheels and the left set of wheels are exchangeable with each other on the automated rail cart.

23. The multi-level storage structure of claim 16 wherein the flange is along a bottom of the aisle rail.

24. A multi-level storage structure, comprising:
a plurality of spaced apart vertical supports;
a plurality of row spacing members connected to and laterally spacing apart the vertical supports;
a plurality of row rails connected to and longitudinally spacing apart the vertical supports, the row rails being configured to support at least one row cart;
a plurality of aisle rails extending perpendicular to the plurality of row rails and configured to support at least one aisle cart;
a plurality of pre-formed holes formed in at least one of the vertical supports, row spacing members, row rails, and aisle rails to mount at least one of a lighting system, a fire suppression system, and a fall protection system, the plurality of pre-formed holes being formed prior to assembly of the storage structure; and
said at least one of the lighting system, the fire suppression system, and the fall protection system mounted via the pre-formed holes.

25. The multi-level storage structure of claim 24 wherein said fire suppression system is mounted to the pre-formed holes in the plurality of row spacing members.

26. The multi-level storage structure of claim 24 comprising said fire suppression system and said lighting system mounted to different groups of said pre-formed holes.

* * * * *